(No Model.) 4 Sheets—Sheet 3.
C. LEAVITT.
WIND ENGINE.

No. 321,985. Patented July 14, 1885.

Witness,
F. R. Tibbitts.
M. G. Horton.

Inventor,
Charles Leavitt
per Geo. W. Tibbitts atty (No Model.)

C. LEAVITT.
WIND ENGINE.

No. 321,985. Patented July 14, 1885.

Witness,

Inventor,
Charles Leavitt

UNITED STATES PATENT OFFICE.

CHARLES LEAVITT, OF CLEVELAND, OHIO.

WIND-ENGINE.

SPECIFICATION forming part of Letters Patent No. 321,985, dated July 14, 1885.

Application filed February 19, 1885. (No model.)

*To all whom it may concern:*

Be it known that I, CHARLES LEAVITT, of Cleveland, in the county of Cuyahoga and State of Ohio, have invented certain new and useful Improvements in Wind-Engines, of which the following is a specification.

This invention relates to improvements in wind-engines, having for their objects to increase the power and efficiency of such motors which are actuated by force of the winds. A further object is to provide a means of governing and regulating the speed of such motors.

The first of these improvements consists in providing two wind-wheels upon one shaft, the second, or auxiliary wheel, revolving in the opposite direction to the first, and provided with a peculiarly-constructed bevel-gear mechanism in combination with the shaft, whereby the power of said second wheel is employed to exert its force to increase the power of the engine.

The second of these improvements consists in providing a governor, in combination with the vane, whereby the velocity of the governor tends to draw upon the arm of the vane in such a manner that, as the force of the wind increases, the effect upon the vane is such as to turn the wheels around, or, rather, the turntable upon which the wheels are supported, away from the direct course of the wind, and thereby diminishing the effect of the wind upon the wheels. As the governor relaxes its power upon the vane, the wheels are again brought around to face the wind. By this means a uniformity of speed in the working of the engine is maintained.

Figure 1:
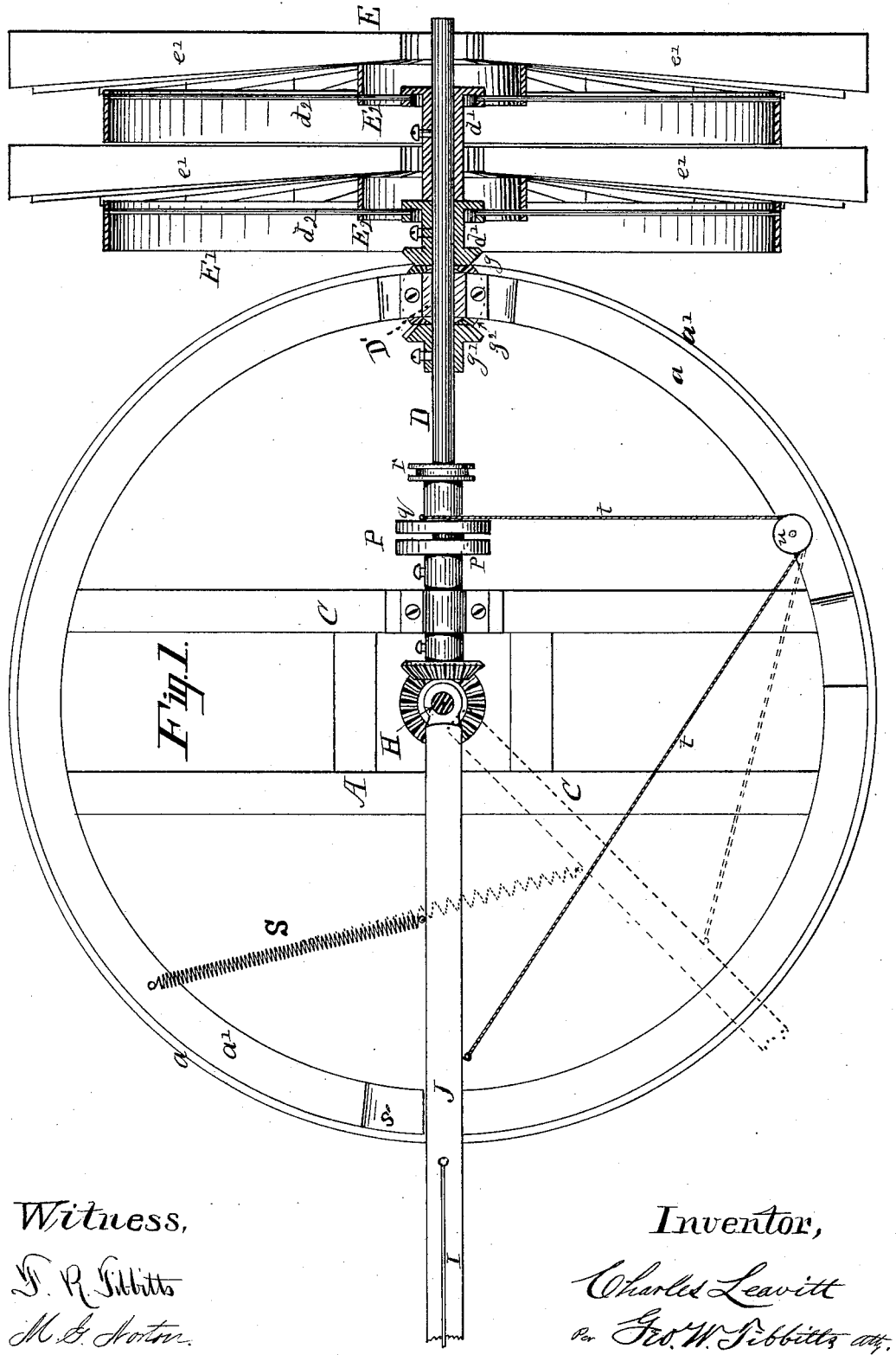
Figure 2:
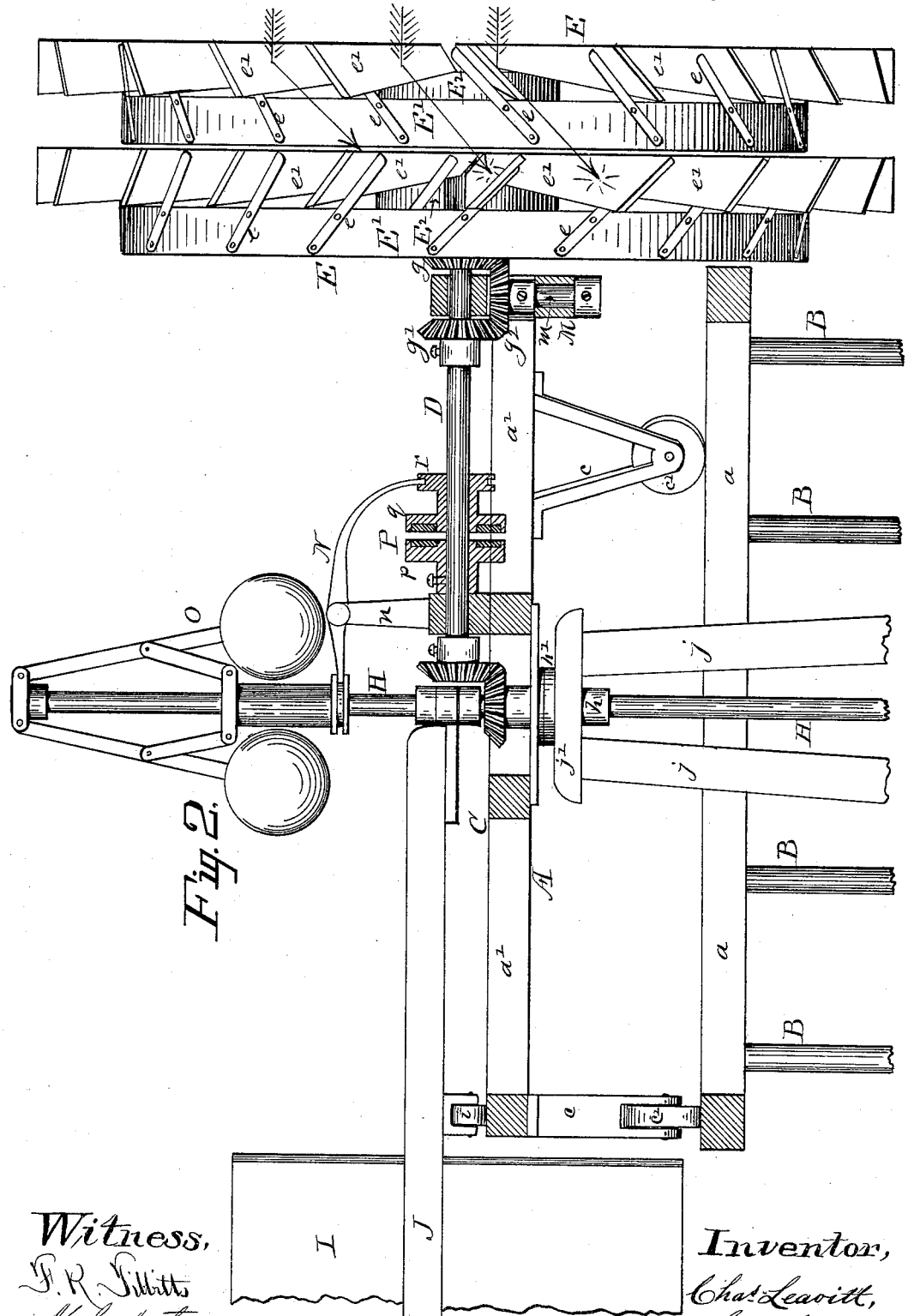
Figure 3:
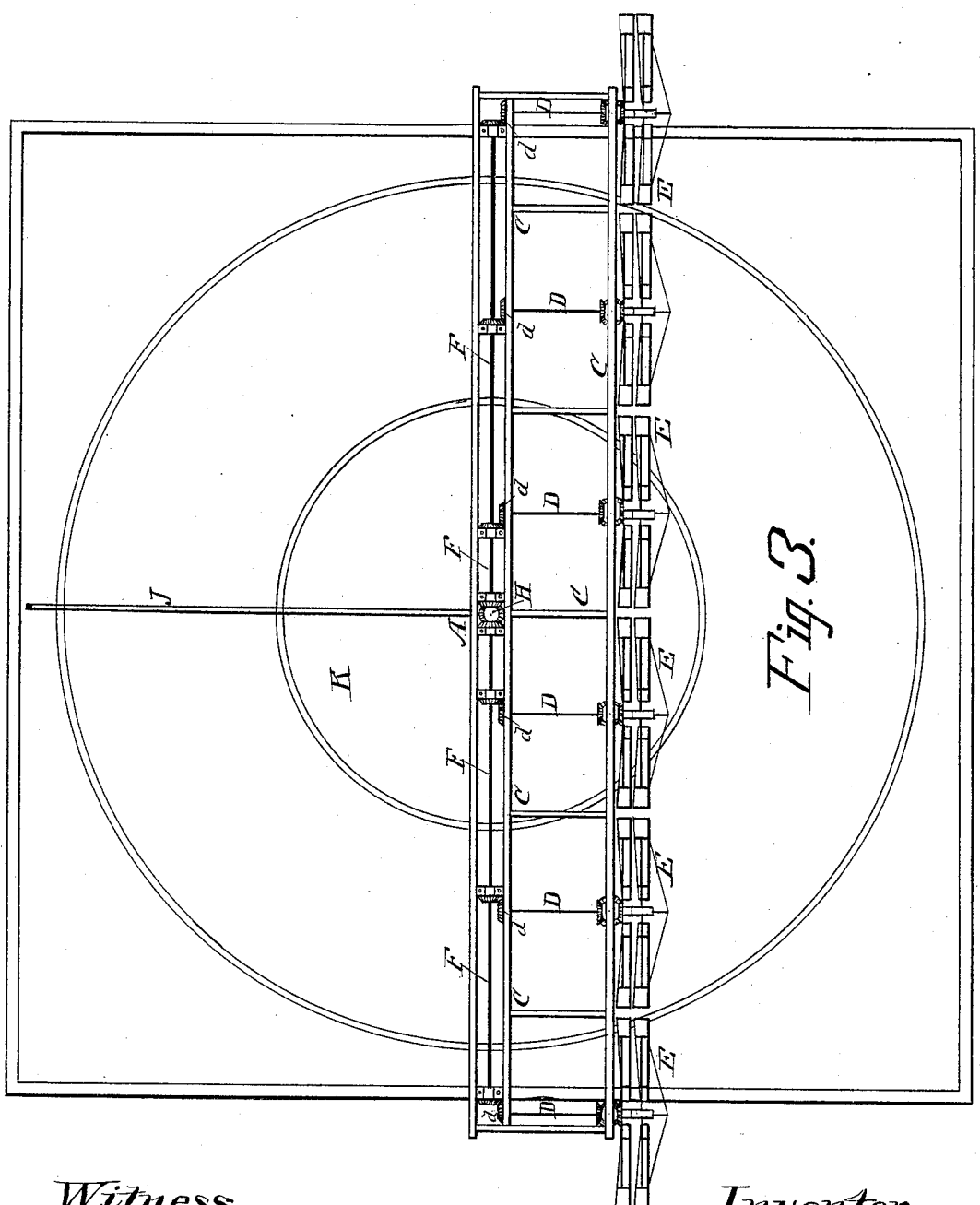
Figure 4:
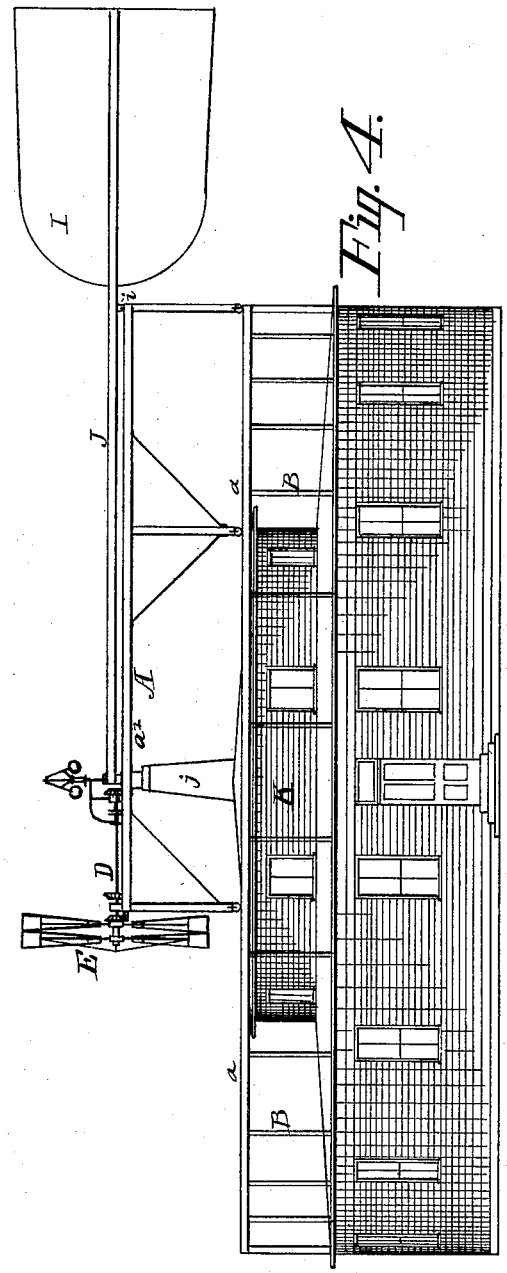
Figure 5:
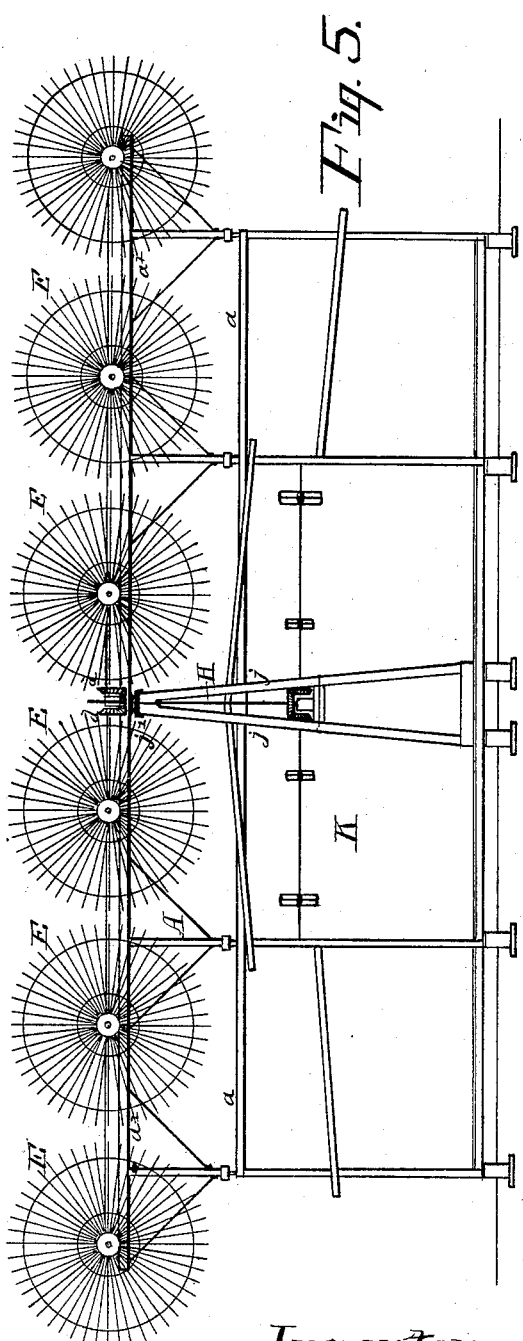

In the accompanying drawings, Figure 1 is a plan view in horizontal section, showing the construction and application of two wind-wheels to the shaft, also showing the governor mechanism. Fig. 2 is a side elevation, partly in section, of the same. Fig. 3 is a plan view of a building and supports for a series or groups of wind-wheels arranged for operating one common shaft for employing their combined power. Fig. 4 is a side elevation of the same. Fig. 5 is the skeleton frame-work of said building in elevation, showing the front or faces of the several wind-wheels in line.

A is a turn-table consisting of two circular frames, $a$ and $a'$. The former rests upon the posts B, and the latter is mounted on legs $c$, having wheels $c'$ that roll upon the frame $a$. A frame-work, C, extends across from side to side of the frame $a'$, and is made a part thereof, and is supported at the center upon a tower, as hereinafter shown. Upon this cross frame are mounted the shafts D, that support the wind-wheels E. These shafts are journaled in suitable boxes secured to the frame, and at their respective ends are provided the bevel-gears $d$, that engage similar gears on the shafts F, that in turn are intergeared with the vertical shaft H, that extends to the building below, and from which power may be transmitted as required. A large vane, I, is provided to revolve the turn-table and keep the wind-wheels to the wind. The arm J of the vane I is hinged to the vertical shaft H, and its outer end rides on the circular frame $a'$, it being provided with a wheel, $i$, which rolls on the said frame or circular track $a'$. Said vane and its arm are connected with and controlled by a governor device, as hereinafter described.

The building K, to which the power is conveyed, has posts $j$, forming a central tower from which are supported the shaft H and the frame C. These posts are joined at the top by a cap, $j'$, that is provided with a hub, $h$, and a bearing-plate, $h'$, through which the shaft H passes, and upon which the center plate of the turn-table turns.

Thus far the description and illustrations do not materially differ from my Patent No. 307,312, of October 28, 1885. The present improvements are additional to those contained in said patent.

The first of these improvements is in the construction of the wind-wheels, and consists, as before stated, in the combination upon one shaft of two distinct wheels, the second or rear wheel revolving in the opposite direction to that of the first, it being arranged to turn loosely on the shaft, but is connected by bevel-gear in such a manner that its power is applied for turning the shaft in the same direction that the first wheel does, and thereby assists to increase the power applied to said shaft. The two wheels are constructed alike, except that the sails of the second wheel slant in the opposite angle to those of the first wheel, as will be seen by referring to Fig. 2, the object of which is to provide that the currents of wind, which strike the sails of the first wheel, are diverged in their passage through the interstices between the sails, and are directed squarely against the angular sides of the sails of the second wheel, as indicated by the arrow, Fig. 2. In constructing said wheels the hubs $d'$, attached to the shaft D, have holes in their periphery, into which are secured the spokes $d^2$, the outer ends of which support the outer rim or band E'. There is also a second and smaller rim or band $E^2$, supported by said spokes, near to the center of the wheels. To the said rims are attached diagonal arms $e$, to which the sails $e'$ are secured. The hub of the outer wheel is keyed fast to the shaft, while the hub of the inner wheel turns loosely on the shaft; but the hub of said inner wheel is provided with a bevel-gear, $g$, which rotates close to the bearing D' of the shaft D. Upon said shaft is also keyed a second bevel-gear, $g'$, which rotates on the opposite side of said bearing D'. Beneath said bearing D' is provided a hanger, M, in which is journaled a short vertical shaft, $m$, provided with a bevel-gear, $g^2$, which is interposed between the two gears $g\ g'$, the purpose of which is to transmit the force of the second wheel to the shaft D, as before stated.

To the upper part of the vertical shaft H is attached a ball-governor, O, connected by a bent lever, N, pivoted in a post, $n$, standing upon the frame C, to a friction-clutch, P, consisting of two disks, $p$ and $q$, on the shaft D. The disk $p$ is keyed fast to the shaft, while the other, $q$, is loosely placed thereon, and is provided with a grooved wheel or disk, $r$, which is actuated by the lever N. The hub of said disk $q$ forms a spool, to which is attached a cord or rope, $t$, passed around a sheave or pulley, $u$, at one side of the frame C, the other end being fastened to the arm J of the vane I.

The operation of this is as follows: The velocity of the revolving governor closes the friction-disks $p\ q$ together, the traction of which rotates the spool, which winds up the cord $t$, thus drawing upon the arm of the vane, turns the turn-table around, so as to bring the wheels out of the direct line of the wind, and thereby regulates the speed of the said wheels. A spring, $s$, is attached to the arm J, connecting it with the frame $a'$, which, when the draw of the clutch on the cord is relaxed, the arm and vane are again drawn back into their normal position, there being a stop, $s'$, on the frame which limits the back movement of the arm.

From the foregoing it will be seen that when the vane is in its normal position it turns the turn-table and holds the wheels to the wind but when the cord draws upon the vane the wheels are turned away from the wind. It will also be seen that by the duplication of the wind-wheels upon one shaft, in the manner described, a large increase of power is gained at very little additional expense.

Having described my invention, I claim—

The combination, with the vertical shaft H, of the governor O, connected by lever N to clutch P, consisting of friction-disks $p\ q$, said disk $q$ constituting a loose spool on the shaft D, and provided with cord $t$, connected to the sheave $u$ on turn-table A, the other end of said cord attached to the arm J of the vane I, having a spring, $s$, for counteracting the governor, the purpose of the governor being to regulate the speed of the wind-wheels, substantially as specified.

CHARLES LEAVITT.

Witnesses:
  GEO. W. TIBBITTS,
  E. W. LAIRD.